United States Patent
Yi et al.

(10) Patent No.: US 11,732,629 B1
(45) Date of Patent: Aug. 22, 2023

(54) SYSTEM, APPARATUS, AND METHOD FOR DIESEL EXHAUST FLUID (DEF) DOSING

(71) Applicant: Caterpillar Inc., Peoria, IL (US)

(72) Inventors: Yong Yi, Dunlap, IL (US); Karthick Govindan, Chennai (IN); Taeyoung Kim, Suwanee, GA (US); Matthew T. Wolk, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/740,362

(22) Filed: May 10, 2022

(51) Int. Cl.
| | |
|---|---|
| *F01N 3/20* | (2006.01) |
| *F01N 3/28* | (2006.01) |
| *F01N 3/029* | (2006.01) |
| *B01D 53/90* | (2006.01) |
| *B01D 53/94* | (2006.01) |

(52) U.S. Cl.
CPC ......... *F01N 3/2066* (2013.01); *F01N 3/2892* (2013.01); *B01D 53/90* (2013.01); *B01D 53/9418* (2013.01); *B01D 53/9422* (2013.01); *B01D 53/9436* (2013.01); *B01D 2251/20* (2013.01); *F01N 3/0293* (2013.01); *F01N 3/206* (2013.01); *F01N 3/208* (2013.01); *F01N 2240/20* (2013.01); *F01N 2340/06* (2013.01); *F01N 2570/14* (2013.01); *F01N 2570/18* (2013.01); *F01N 2610/02* (2013.01); *F01N 2610/03* (2013.01); *F01N 2610/102* (2013.01); *F01N 2610/14* (2013.01); *F01N 2610/1453* (2013.01); *F01N 2900/04* (2013.01); *F01N 2900/14* (2013.01); *F01N 2900/18* (2013.01); *F01N 2900/1806* (2013.01)

(58) Field of Classification Search
CPC combination set(s) only.
See application file for complete search history.

(56) References Cited

U.S. PATENT DOCUMENTS

| | | | |
|---|---|---|---|
| 10,823,034 B1 | 11/2020 | Giacomin et al. | |
| 10,982,605 B2 | 4/2021 | Were et al. | |
| 11,092,056 B2 | 8/2021 | Sandou et al. | |
| 2008/0302088 A1* | 12/2008 | Koehler | F01N 3/2066 60/299 |

(Continued)

FOREIGN PATENT DOCUMENTS

| | | |
|---|---|---|
| CN | 111335985 A | 6/2020 |
| CN | 112459884 A | 3/2021 |

(Continued)

*Primary Examiner* — Binh Q Tran
(74) *Attorney, Agent, or Firm* — Xsensus LLC (57) ABSTRACT

Systems, apparatuses, assemblies, and methods for diesel exhaust fluid (DEF) dosing can include a body defining an injector adaptor inlet and an injector adaptor outlet; and an injector mount or interface extending from the body. The injector mount can be between the first and second ends of the injector adaptor. The injector adaptor outlet can define an area greater than an area of the injector adaptor inlet. In a side view of the injector adaptor, at a bottom side of the body, a first straight line can extend along the body from the injector adaptor inlet to the injector adaptor outlet, and at a top side of the body opposite the bottom side, a second straight line can extend along the body from the injector adaptor inlet to the injector adaptor outlet. The second straight line can be at an acute angle relative to the first straight line.

20 Claims, 5 Drawing Sheets

(56) References Cited

U.S. PATENT DOCUMENTS

| | | | |
|---|---|---|---|
| 2009/0092525 A1* | 4/2009 | Ichikawa | B01D 53/90 |
| | | | 422/177 |
| 2010/0107614 A1* | 5/2010 | Levin | F01N 3/36 |
| | | | 60/303 |
| 2011/0094206 A1* | 4/2011 | Liu | B01F 25/4315 |
| | | | 60/274 |
| 2011/0214415 A1* | 9/2011 | Thomas | F01N 13/009 |
| | | | 60/299 |
| 2017/0342886 A1* | 11/2017 | Gavin | F01N 3/2066 |
| 2019/0024563 A1* | 1/2019 | Wang | F01N 11/00 |
| 2021/0071600 A1 | 3/2021 | Were et al. | |
| 2022/0065148 A1 | 3/2022 | Sudries et al. | |

FOREIGN PATENT DOCUMENTS

| | | |
|---|---|---|
| CN | 112539100 A | 3/2021 |
| DE | 102017206794 A1 | 10/2018 |
| DE | 202021104734 U1 | 10/2021 |

\* cited by examiner

SYSTEM, APPARATUS, AND METHOD FOR DIESEL EXHAUST FLUID (DEF) DOSING

TECHNICAL FIELD

The present disclosure pertains to diesel exhaust fluid (DEF) dosing, more particularly to an injector adaptor to accommodate a DEF injector implemented downstream of but in relatively close proximity to an output of a turbocharger, and systems, apparatuses, assemblies, and methods thereof.

BACKGROUND

Exhaust systems with aftertreatment may be required to provide de-$NO_x$ capability, as well as limit system back-pressure (including system back-pressure increment), minimize diesel exhaust fluid (DEF) deposit formation risk, and provide sufficient $NH_3$ mixing before an initial catalyst. Varying packaging space, however, may pose challenges to the exhaust system configuration and layout to and the ability to suitably provide some or all of the foregoing system operating characteristics.

U.S. Patent Pub. No. 2022/0065148 ("the '148 patent publication") describes a mixer and exhaust aftertreatment system. The exhaust aftertreatment system can comprise the mixer, a doser, an SCR catalyst. According to the '148 patent publication, the doser can inject a reducing agent solution such as a urea solution into the mixer to mix with the exhaust, where the exhaust and urea mixture is output from the mixer to a SCR catalyst that can perform a reaction to transform the nitrogen oxides of the exhaust into nitrogen and water.

SUMMARY

According to an aspect of the present disclosure, an injector adaptor is disclosed or can be provided or implemented. The injector adaptor can comprise: a body defining an injector adaptor inlet at a first end of the injector adaptor and an injector adaptor outlet at a second end of the injector adaptor opposite the first end; and an injector mount extending from the body in a direction away from the injector adaptor outlet, the injector mount being between the first end and the second end of the injector adaptor. The injector adaptor outlet can define a first area and the injector adaptor inlet can define a second area, where the first area can be greater than the second area. In a side view of the injector adaptor, at a bottom side of the body of the injector adaptor, a first straight line can extend along the body from the injector adaptor inlet to the injector adaptor outlet, and in the side view of the injector adaptor, at a top side of the body of the injector adaptor opposite the bottom side, a second straight line can extend along the body from the injector adaptor inlet to the injector adaptor outlet. The second straight line can be at an acute angle relative to the first straight line.

According to another aspect of the present disclosure, an exhaust assembly is disclosed or can be provided or implemented. The exhaust assembly can comprise: an injector adaptor to be provided downstream of a turbocharger for an engine, the injector adaptor having a body that defines an injector adaptor inlet and an injector adaptor outlet opposite the injector adaptor inlet; and a diesel exhaust fluid (DEF) injector coupled to an injector interface of the injector adaptor to inject DEF into an internal volume of the injector adaptor. The injector adaptor outlet can have a first area greater than a second area of the injector adaptor inlet. The injector adaptor can include a mixer at the injector adaptor outlet. The DEF injector can be coupled to the injector interface of the injector adaptor at a top side of the body of the injector adaptor. In a side view of the injector adaptor a bottom side of the body of the injector adaptor can extend in a first plane, straight from the injector adaptor inlet to the injector adaptor outlet, and the top side of the body of the injector adaptor can extend in a second plane at an acute angle relative to the first plane.

According to yet another aspect of the present disclosure, an engine system is disclose or can be provided or implemented. The engine system can comprise: a turbo having a turbo outlet; an injector adaptor at the turbo outlet, the injector adaptor having an injector adaptor body that defines an injector adaptor inlet and an injector adaptor outlet opposite the injector adaptor inlet; a bent conduit having a conduit body that defines a conduit inlet and a conduit outlet opposite the conduit inlet, the conduit inlet of the bent conduit being directly connected to the injector adaptor outlet; a diesel exhaust fluid (DEF) injector coupled to an injector interface of the injector adaptor to inject DEF directly into the injector adaptor; and a selective catalytic reduction (SCR) system having an aftertreatment inlet directly coupled to the conduit outlet of the bent conduit. The body of the injector adaptor can be in the form of an asymmetric diverging cone with the injector adaptor outlet being greater in area than the injector adaptor inlet. The DEF injector can be coupled to the injector interface of the injector adaptor at a top side of the body of the injector adaptor. In a side view of the injector adaptor a bottom side of the body of the injector adaptor can extend in a first plane, straight from the injector adaptor inlet to the injector adaptor outlet, and the top side of the body of the injector adaptor can extends in a second plane at an acute angle relative to the first plane.

DETAILED DESCRIPTION

The present disclosure relates to diesel exhaust fluid (DEF) dosing, more particularly to an injector adaptor to accommodate a DEF injector implemented downstream of but in relatively close proximity to an output of a turbocharger, and systems, apparatuses, assemblies, and methods thereof.

Figure 1:
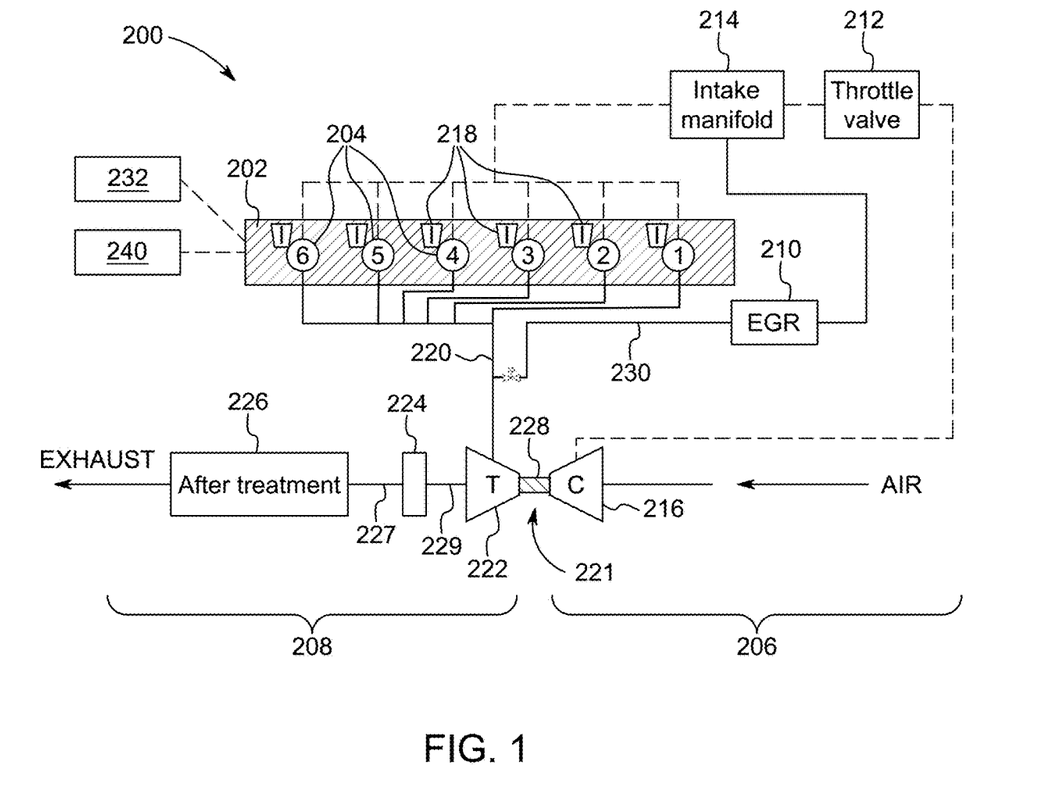
FIG. 1 is a diagram of an engine system according to one or more embodiments of the disclosed subject matter.

FIG. 1 is a diagram of an example engine system 200 according to one or more embodiments of the disclosed subject matter. The engine system 200 may include a compression ignition internal combustion engine 201. However, the engine system 200 may include any other type of internal combustion engine, such as a compression internal combustion engine. The engine system 200 may be fueled by such fuels as distillate diesel fuel, biodiesel, dimethyl ether, gaseous fuels, such as hydrogen, natural gas, and propane, alcohol, ethanol, and/or any combination thereof.

The engine 201 of the engine system 200 may include an engine block 202 with a plurality of cylinders 204 (engine block 202 of FIG. 1 is shown with six cylinders 204, labeled 1-6). A piston assembly may be included within each of cylinders 204 to form a combustion chamber within each cylinder 204. The engine 201 may include any number of combustion chambers, and the combustion chambers may be disposed in an in-line configuration, a "V" configuration, or in any other suitable configuration. Furthermore, the engine system 200 may consume one or more consumable resources (e.g., a fuel (e.g., gasoline, diesel fuel, and/or the like), a diesel exhaust fluid or fuel (DEF), one or more coolants, one or more lubricants (e.g., an oil, a grease, and/or the like), and/or the like) during operation (e.g., due to combustion in the engine block 202).

The engine system 200 may be implemented in any suitable machine. The term "machine" may refer to any machine that performs an operation associated with an industry such as, for example, mining, construction, farming, transportation, or any other industry. As some examples, the machine may be a vehicle, a backhoe loader, a cold planer, a wheel loader, a compactor, a haul truck, a forest machine, a forwarder, a harvester, an excavator, an industrial loader, a material handler, a motor grader, a pipelayer, a road reclaimer, a skid steer loader, a skidder, a telehandler, a tractor, a dozer, a tractor scraper, or other above ground equipment, underground equipment, aerial equipment, or marine equipment.

Engine system 200 may include multiple systems. For example, as shown in the example of FIG. 1, engine system 200 may include an air intake or air induction system 206, an exhaust system 208, and/or an exhaust gas recirculation (EGR) system 210. Air induction system 206 may be configured to direct air, or an air and fuel mixture (e.g., of air and another gas, such as exhaust gas) into the engine system 200 for subsequent combustion. Exhaust system 208 may exhaust or release byproducts of the combustion, for instance, to an atmosphere external to the engine system 200. A recirculation loop of the EGR system 210 may direct a portion of the exhaust gases from exhaust system 208 back into air induction system 206 for subsequent combustion.

A turbine 222 may be located to receive exhaust gas leaving engine system 200 and may be connected to the one or more compressors 216 of air induction system 206 by way of a common shaft 228. As exhaust gas exiting engine system 200 can flow through turbine 222 and expand against vanes thereof, where the turbine 222 may rotate and drive the one or more compressors 216 to pressurize inlet air.

Air induction system 206 may include multiple components that cooperate to condition and introduce compressed air into cylinders 204. For example, the air induction system 206 may include a throttle valve 212 and/or an intake manifold 214 located downstream of the one or more compressors 216. The throttle valve 212 may selectively regulate (e.g., restrict) a flow of air into intake manifold 214. Intake manifold 214 may mix air and exhaust gas to create an air and exhaust gas mixture that is directed to the plurality of cylinders 204. The air induction system 206 can feed the cylinders 204 via respective ports and corresponding valves that can open and close via valve actuators 218. Air induction system 206 may include an air cooler, a filtering component, a compressor bypass component, and/or the like.

EGR system 210 may redirect gases from exhaust system 208 back into air induction system 206 for subsequent combustion. The exhaust gas to be recirculated may be removed upstream of the turbine 222. For example, the exhaust gas may be diverted from an exhaust gas passageway 220 via an EGR conduit 230 to the air induction system 206. Likewise, the recirculated exhaust gas may be re-introduced to the air induction system 206 downstream of the compressor 216.

The one or more compressors 216, the common shaft 228, and the turbine 222 may form a turbo or turbocharger 221. The turbine 222 may include adjustable vanes such that a distance between the adjustable vanes may be changed to alter performance, which, therefore, may make the turbocharger 221 referred to or characterized as a variable geometry turbocharger (VGT).

Exhaust system 208 may include multiple components that cooperate to condition and direct exhaust gas from cylinders 204 to the atmosphere. For example, exhaust system 208 may include the exhaust gas passageway 220, the turbine 222 (including one or more turbines) driven by exhaust gas flowing through exhaust gas passageway 220, an injector adaptor 224 to accommodate a DEF injector, and an exhaust aftertreatment system or device 226 (e.g., an aftertreatment selective catalytic reduction (SCR) device or system).

Exhaust aftertreatment device 226 may receive exhaust gas from the turbocharger 221 and trap or convert particular constituents (e.g., NON) in the gas stream. In one example, exhaust aftertreatment device 226 may embody a selective catalytic reduction (SCR) device having an oxidation catalyst located downstream from a reductant injector. The oxidation catalyst can cause a chemical reaction to alter the composition of the exhaust. For example, a gaseous or liquid reductant, most commonly urea or a water and urea mixture, may be sprayed or otherwise advanced into the exhaust upstream of the oxidation catalyst by a reductant injector. As the reductant is absorbed onto the surface of the oxidation catalyst, the reductant may react with $NO_x$ (NO and $NO_2$) in the exhaust gas to form water ($H_2O$) and elemental nitrogen ($N_2$). In some embodiments, a hydrolysis catalyst may be associated with the oxidation catalyst to promote even distribution and conversion of urea to ammonia ($NH_3$). The temperatures of the exhaust gas flow entering exhaust aftertreatment device 226 may need to be high enough, in combination with the oxidation catalyst and the reductant, to react with the $NO_x$ (NO and $NO_2$) in the exhaust gas.

As shown in FIG. 1, the injector adaptor 224 can be downstream of the turbocharger 221, at an outlet of the turbine 222 of the turbocharger 221, and the exhaust aftertreatment device 226 can be downstream of the injector adaptor 224. The outlet of the turbine 222 may be referred to or characterized as an outlet of the turbocharger 221, that is, a turbo outlet.

According to one or more embodiments, an inlet of the injector adaptor 224 can be directly connected or coupled to the outlet of the turbocharger 221. Alternatively, the injector adaptor may be indirectly connected to the outlet of the turbocharger 221, where a conduit 229 can be provided (e.g., directly coupled to) between the outlet of the turbocharger 221 and the inlet of the injector adaptor 224. Optionally, the conduit 229 may have one or more bends. That is, the conduit 229 may be bent. As an example, the conduit 229 may be from one inch to three inches in length. Incidentally, the injector adaptor 224 can have only one inlet.

According to one or more embodiments, an outlet of the injector adaptor 224 can be connected or coupled to an inlet of the exhaust aftertreatment system 226. Such coupling may be direct or indirect, for instance, with a conduit 227 provided between the injector adaptor 224 and the exhaust aftertreatment system 226. Thus, the conduit 227 can have a body that defines an inlet and an outlet opposite the inlet, where the inlet of the conduit 227 may be directly connected to the outlet of the injector adaptor 224 and the outlet of the conduit 227 may be directly connected to an inlet of the exhaust aftertreatment system 226. Incidentally, the injector adaptor 224 can have only one outlet. The conduit 227 may represent one or more conduits connected together end-to-end. Furthermore, the conduit 227 may have one or more bends. That is, the conduit 227 may be bent.

Engine system 200 of FIG. 1 can also include an electronic control module (ECM) 240. Generally, ECM 240 can control engine system 200 and/or components of engine system 200. ECM 240 may be implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor may be implemented in hardware, firmware, and/or a combination of hardware and software. ECM 240 may include one or more processors capable of being programmed to perform a function. One or more memories, including a random-access memory (RAM), a read only memory (ROM), and/or another type of dynamic or static storage device (e.g., a flash memory, a magnetic memory, and/or an optical memory) may store information and/or instructions for use by ECM 240. ECM 240 may include a memory (e.g., a non-transitory computer-readable medium) capable of storing instructions, that when executed, cause the processor to perform one or more processes and/or methods described herein.

Sensor system 232 may provide measurements associated with various parameters used by ECM 240 to control engine system 200 and/or components of engine system 200. Sensor system 232 may include physical sensors and/or any appropriate type of control system that generates values of sensing parameters based on a computational model and/or one or more measured parameters. As used herein, sensing parameters may refer to those measurement parameters that are directly measured and/or estimated by one or more sensors (e.g., physical sensors, virtual sensors, and/or the like). Example sensors may include temperature sensors (e.g., to measure a temperature of exhaust gas at the outlet of the turbocharger 221, at the outlet of the injector adaptor 224, and/or at the inlet of the exhaust aftertreatment device 226, speed sensors (e.g., to measure a speed of the engine system 200 (e.g., in terms of revolutions per minute (RPM)), a speed of machine 100 (e.g., in terms of kilometers per hour, miles per hour, and/or the like), etc.), chemical composition sensors (e.g., to measure an amount of $NO_x$ in exhaust gas), pressure sensors (e.g., to measure a pressure of the intake manifold 214 (e.g., an internal pressure of the intake manifold 214 in terms of kilopascals (kPa)), engine airflow sensors (e.g., to measure an engine airflow rate in terms of cubic meters per minute, cubic feet per minute, and/or the like), engine braking sensors (e.g., to measure a requested amount of engine braking power) and/or the like. Sensing parameters may also include any output parameters that may be measured indirectly by physical sensors and/or calculated based on readings of physical sensors.

Figure 2:
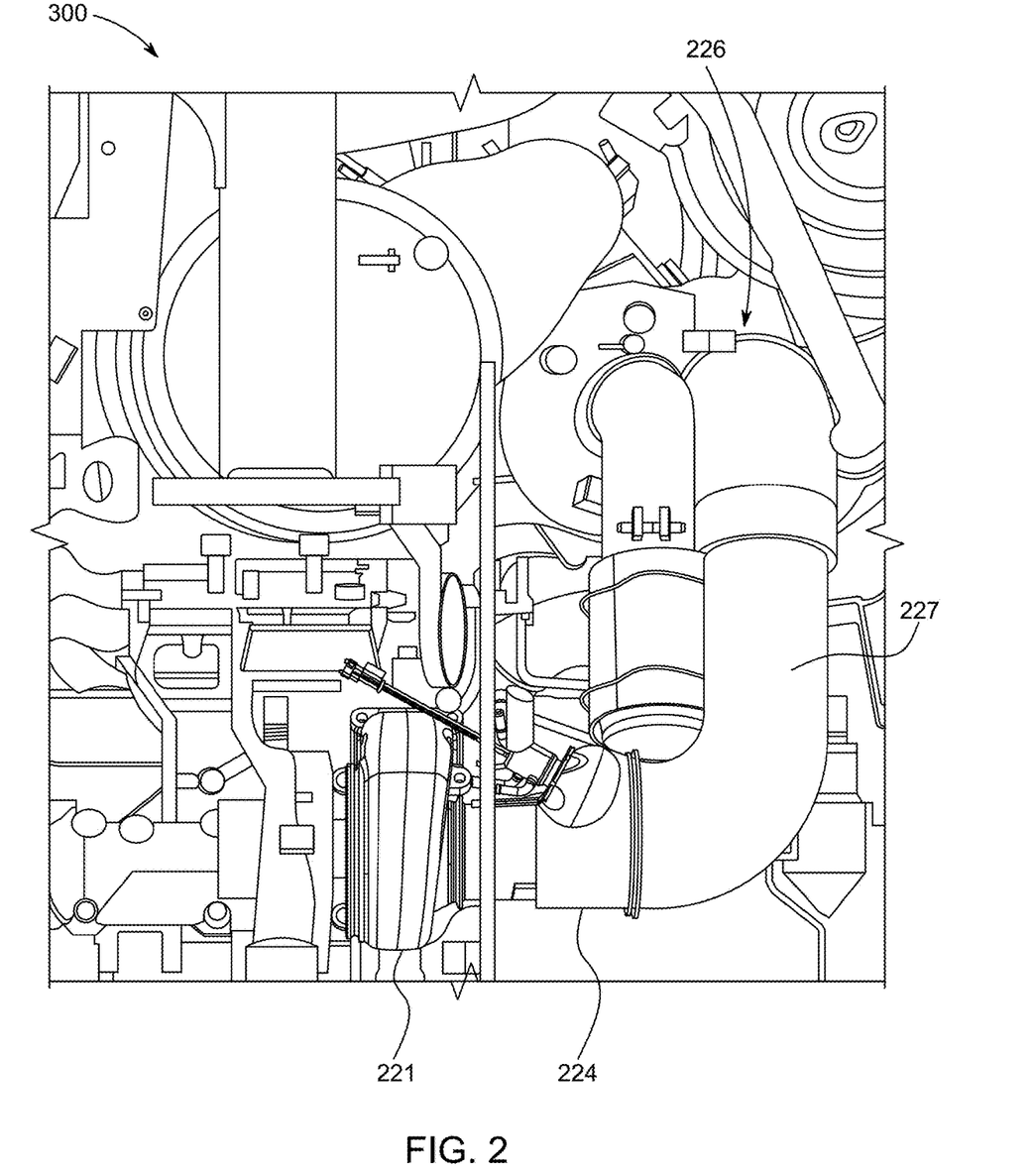
FIG. 2 shows a portion of an engine system according to one or more embodiments of the disclosed subject matter.
Figure 3:
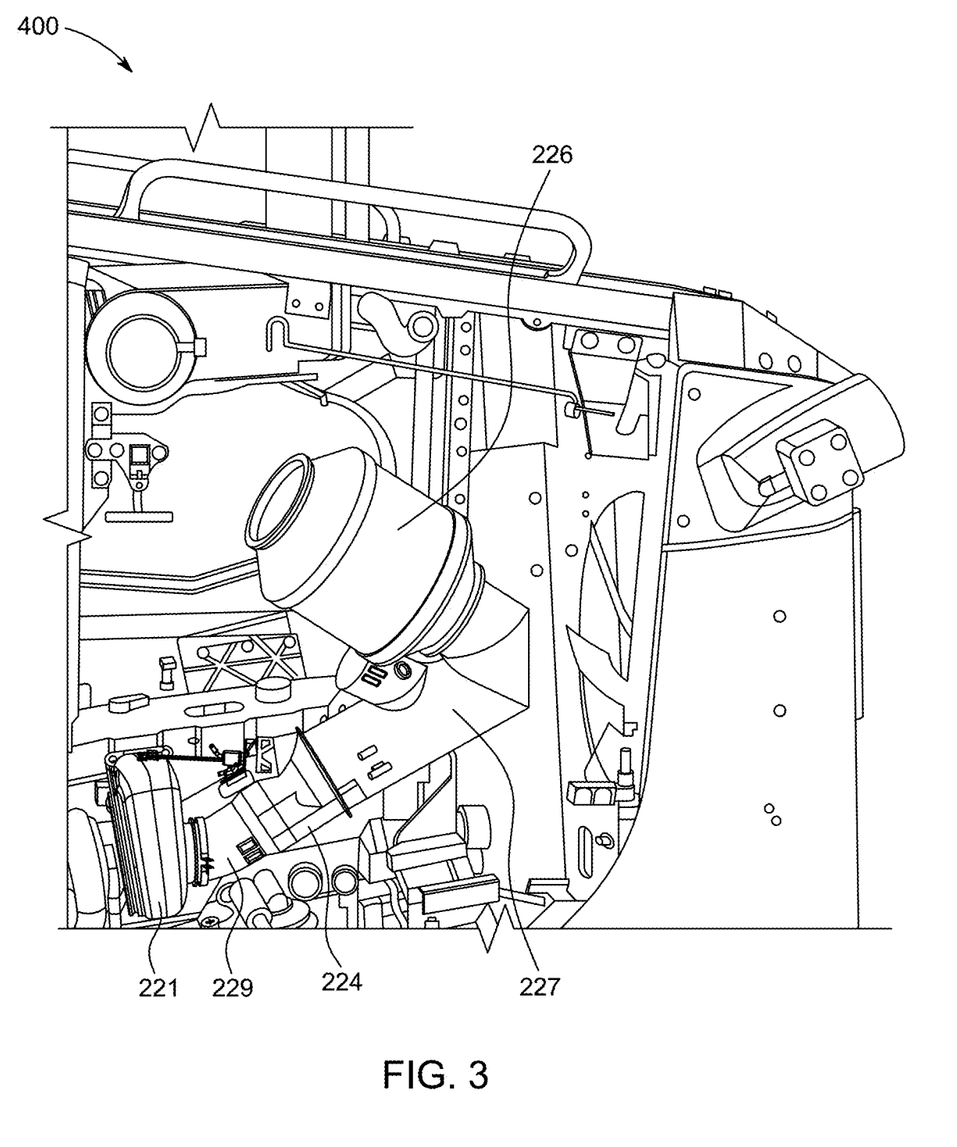
FIG. 3 is shows a portion of another engine system according to one or more embodiments of the disclosed subject matter.

Turning now to FIG. 2 and FIG. 3, these figures show portions of an exemplary engine system 300 and an exemplary engine 400 according to one or more embodiments of the disclosed subject matter.

In FIG. 2, the turbocharger 221 and the injector adaptor 224 are directly coupled together. That is, the outlet of the turbocharger 22 is directly connected to the inlet of the injector adaptor 224. The injector adaptor 224, however, is indirectly coupled to the inlet of the exhaust aftertreatment device 226 via the conduit 227. Here, the conduit 227 is bent so as to extend from the outlet of the injector adaptor 224 to the inlet of the exhaust aftertreatment device 226.

In FIG. 3, the conduit 229 is between the turbocharger 221 and the injector adaptor 224 and the conduit 227 is between the injector adaptor 224 and the exhaust aftertreatment system/device 226. Thus, the injector adaptor 224 is indirectly coupled to the outlet of the turbocharger 221 via the conduit 229. In this example, the conduit 227 is bent to extend from the outlet of the turbocharger 221 to the inlet of the injector adaptor 224. Likewise, the injector adaptor 224 is indirectly coupled to the inlet of the exhaust aftertreatment device 226 via the conduit 227. Here, in this example, the conduit 227 is bent so as to extend from the outlet of the injector adaptor 224 to the inlet of the exhaust aftertreatment device 226.

Figure 4:
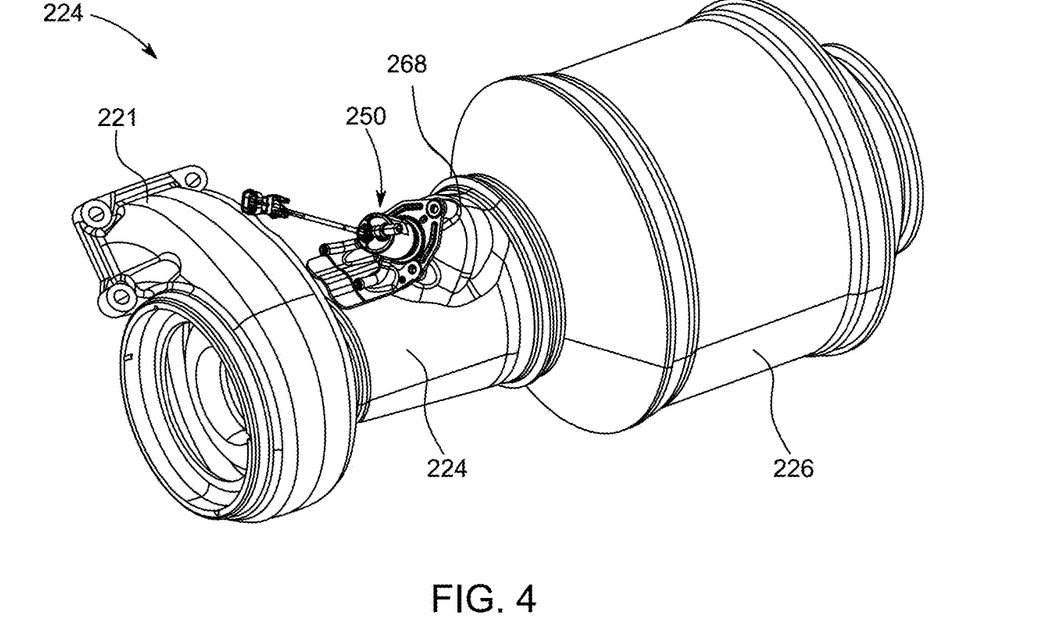
FIG. 4 is a perspective view of an assembly according to aspects of one or more embodiments of the present disclosure.
Figure 5:
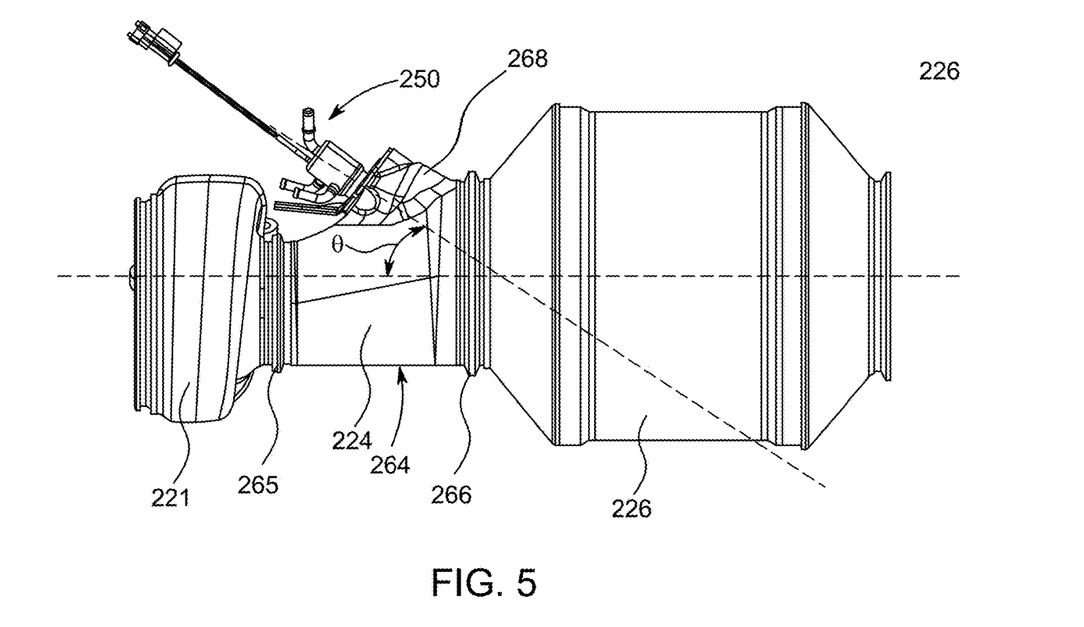
FIG. 5 is a side elevational view of the assembly of FIG. 4.

Turning now to FIG. 4 and FIG. 5, as noted above, the injector adaptor 224 can accommodate a diesel engine fluid or fuel (DEF) injector. FIG. 4 and FIG. 5 show an exemplary diesel engine fluid (DEF) injector 250. The DEF injector 250 can inject diesel engine fluid into an internal volume of the injector adaptor 224. FIG. 4 and FIG. 5 shows the exhaust aftertreatment device 226 directly connected to the injector adaptor 224. However, as noted above, embodiments of the disclosed subject matter are not limited to a direct connection between the outlet of the injector adaptor 224 and the inlet of the exhaust aftertreatment device 226.

The injector adaptor 224 can have a body 264 that defines an inlet 265 and an outlet 266. The inlet 265 may be at a first end of the body 264 and the outlet 266 may be at a second end of the body 264 opposite the first end of the body 264. The inlet 265 and the outlet 266 may be referred to herein as an injector adaptor inlet and an injector adaptor outlet, respectively.

The inlet 265 of the injector adaptor 224, that is, the opening thereof, can be greater than the opening of the outlet 266. For instance, the opening of the inlet 265 can define a first area and the opening of the outlet 266 can define a second area, where the second area can be greater than the first area. According to one or more embodiments, the opening of the inlet 265 and/or the opening of the outlet 266 can be circular (in an end view of the injector adaptor 224). Thus, the diameter and circumference of the opening at the outlet 266 can be greater than the diameter and circumference of the opening at the inlet 265. As an example, the diameter of the inlet 265 can be four inches and the diameter of the outlet can be six inches.

In that the size of the opening of the outlet 266 can be greater than the size of the opening of the opening of the inlet 265, sidewalls of the body 264 can diverge from the inlet 265 to the outlet 266. Such divergence can improve (e.g., reduce) backpressure. According to one or more embodiments, the body 264 can be in the form of an asymmetric diverging cone, such as shown in FIG. 4 and FIG. 5. In this example, as particularly shown in the side view of FIG. 5, the bottom of the body 264 can extend straight from the inlet 265 to the outlet 266, whereas the top of the body 264 (opposite the bottom) can diverge from the bottom of the body 264 going from the inlet 265 to the outlet 266. Here, a first shortest length from the inlet 265 to the outlet 266 at the bottom of the body 264 can be less than a second shortest length from the inlet 265 to the outlet 266 at the top of the body 264. Thus, a first line or plane extending through the inlet 265 and the outlet 266 at the bottom of the body 264 can be at an acute angle relative to a second line or plane extending through the inlet 265 and the outlet 266 at the top of the body 264.

An injector interface or mount 268 can be provided between the inlet 265 and the outlet 266 and can extend from the body 264. According to one or more embodiments, the injector interface 268 can be formed in one piece with the body 264. Alternatively, the injector interface 268 can be removably coupled to the injector interface 268, for instance, to accommodate different DEF injection angles.

The injector interface 268 can extend from a top side of the body 264 of the injector adaptor 224, such as shown in FIG. 4 and FIG. 5. Thus, the DEF injector 250 can be removably coupled to the injector interface 268 at the top side of the body 264 of the injector adaptor 224 to inject DEF directly into an internal volume of the injector adaptor 224. Also shown in FIG. 4 and FIG. 5, the injector interface 268 can extend in a direction away from the outlet 266 of the injector adaptor 224. Furthermore, the injector interface 268 can be angled to interface with the DEF injector 250. Generally, the DEF injected or sprayed into the injector adaptor 224 can vaporize (because it is sufficiently close to the relatively hot exhaust outputted from the turbocharger 221) and decompose into $NH_3$ (ammonia) and HNCO (isocyanic acid), which can then react with $NO_x$ in the exhaust to form byproducts of nitrogen and water.

The DEF injector 250 can be coupled or mounted to the injector interface 250 such that the DEF is injected into the internal volume of the injector adaptor 224 at an angle $\theta$ relative to a longitudinal axis extending through the body 264 of the injector adaptor 224. The angle $\theta$ may be an acute angle. For instance, the angle $\theta$ may be from 20 to 50 degrees (inclusive), for instance, at or about at 35 degrees, wherein the angle $\theta$ can be selected based on injector adaptor 224 configuration mixer configuration, location, etc.), for instance. According to one or more embodiments, the angle $\theta$ may be set based on the flow pattern from the outlet of the turbocharger 221 and/or anticipated exhaust flow velocity from the turbocharger 221, for instance, based on a revolutions-per-minute (rpm) range of the engine (e.g., 800 rpm to 1800 rpm).

Figure 6:
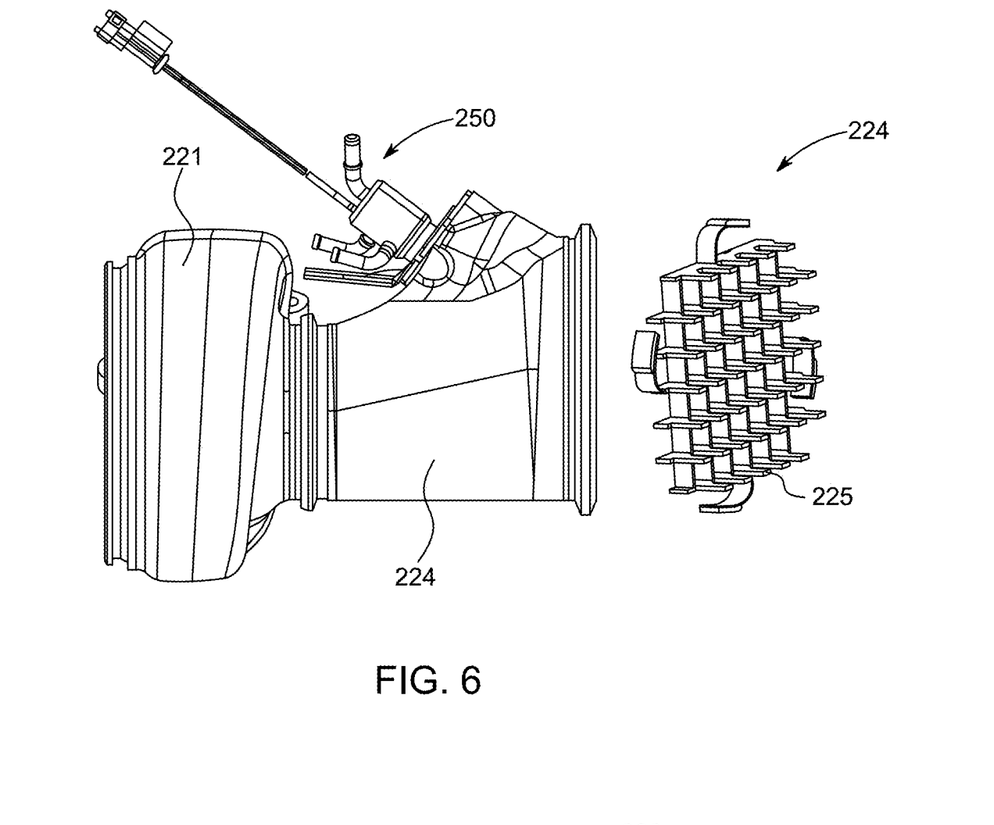
FIG. 6 is a side elevational view of a portion of the assembly of FIG. 4.
Figure 7:
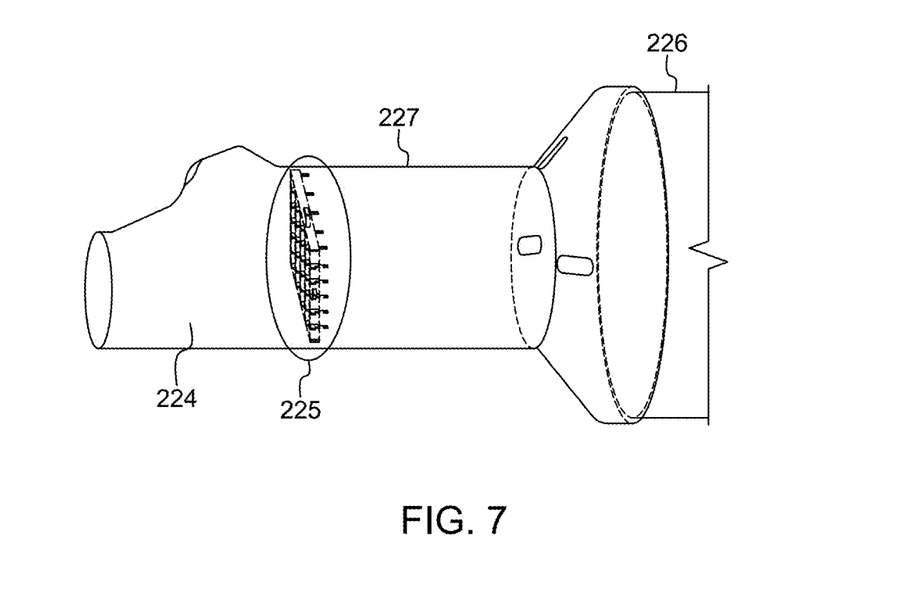
FIG. 7 is a transparent view of an assembly according to one or more embodiments of the disclosed subject matter.

Turning now to FIG. 6 and FIG. 7, according to one or more embodiments, a mixer 225 can be provided at the outlet 266 of the injector adaptor 224. Optionally, the mixer 225 may be part of the injector adaptor 224, whether the mixer 225 is a component separate from the body 264 or formed in one piece with the body 264. Thus, according to one or more embodiments, the mixer 225 may be removably coupled to the body 264 at the outlet 266 of the injector adaptor 224. According to one or more embodiments, the mixer 225 may be only mixer from the inlet 265 of the injector adaptor 224 to the inlet of the exhaust aftertreatment system or device 226.

INDUSTRIAL APPLICABILITY

As noted above, embodiments of the disclosed subject matter pertain to diesel exhaust fluid (DEF) dosing, more particularly to an injector adaptor to accommodate a DEF injector implemented downstream of but in relatively close proximity to an output of a turbocharger, and systems, apparatuses, assemblies, and methods thereof.

Embodiments of the disclosed subject matter can pertain to a close-coupled DEF (diesel exhaust fuel) dosing system. Generally, a close-coupled system (or assembly thereof) according to embodiments of the disclosed subject matter can include a DEF injector placed close to turbo to utilize relatively hot exhaust gas and to provide additional De-$NO_x$ capability for an aftertreatment system. Embodiments of the disclosed subject matter can implement an injector adaptor between the turbo and subsequent conduits of the exhaust system (e.g., an aftertreatment system or device), which can limit the system back-pressure increment, minimize the DEF deposit formation risk, and/or provide sufficient $NH_3$ mixing before reaching a first catalyst, as well as providing de-$NO_x$ capability. According to one or more embodiments, the $NO_x$ can be processed to achieve 0.4 g/kw-hr to 0.04 g/kw-hr (inclusive). Due to the close-coupling of the injector adaptor to the outlet of the turbocharger and hence DEF being injected into the exhaust after it has traveled a relatively short distance from the outlet of the turbocharger, the exhaust aftertreatment device or system (e.g., exhaust aftertreatment system/device 226, such as an SCR aftertreatment system or device) can perform conversation at relatively cool turbocharger outlet temperatures (e.g., less than 200 degrees Celsius) due to the temperature loss that may occur from the outlet of the turbocharger (e.g., 10 to 30 degrees drop from the outlet of the turbocharger to the inlet of the aftertreatment system).

According to one or more embodiments, an injector adaptor with an optional built-in mixer for a close-coupled DEF (diesel exhaust fuel) dosing system is disclosed or can be provided or implemented. The injector adaptor can be mounted on or next to a turbo outlet. And the shape of the injector adaptor is designed to accommodate a varied packaging space. Further, change of upstream or downstream piping may not impact or have minimal impact on system performance.

As noted above, the DEF injector 250 can be coupled or mounted to the injector interface 250 such that the DEF is injected into the internal volume of the injector adaptor 224 at a relatively shallow angle $\theta$ relative to a longitudinal axis extending through the body 264 of the injector adaptor 224. For instance, the angle $\theta$ may be from 20 to 50 degrees (inclusive), for instance, at or about at 35 degrees. According to one or more embodiments, the angle 9 may be set based on the flow pattern from the outlet of the turbocharger 221 and/or anticipated exhaust flow velocity from the turbocharger 221, for instance, based on a revolutions-per-minute (rpm) range of the engine (e.g., 800 rpm to 1800 rpm). The angle $\theta$ may be set to keep DEF liquid centralized, for instance, at or around a central longitudinal axis of the body 264 of the injector adaptor 224. This can better ensure that the flow pattern of the exhaust from the turbocharger can disperse the DEF droplets and reach a middle portion of the optional mixer 225. This may also reduce or minimize DEF deposits.

To the extent that aspects of the present disclosure have been described above with reference to flowchart illustrations and/or block diagrams of methods, apparatus (systems) and computer program products according to embodiments of the present disclosure. In this regard, any flowchart and block diagrams in the figures illustrate the architecture, functionality, and operation of possible implementations of systems, methods and computer program products according to various embodiments of the present disclosure. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. An engine system comprising:
   a turbo having a turbo outlet;
   an injector adaptor at the turbo outlet, the injector adaptor having an injector adaptor body that defines an injector adaptor inlet and an injector adaptor outlet opposite the injector adaptor inlet;
   a bent conduit having a conduit body that defines a conduit inlet and a conduit outlet opposite the conduit inlet, the conduit inlet of the bent conduit being directly connected to the injector adaptor outlet;
   a diesel exhaust fluid (DEF) injector coupled to an injector interface of the injector adaptor to inject DEF directly into the injector adaptor; and
   a selective catalytic reduction (SCR) system having an aftertreatment inlet directly coupled to the conduit outlet of the bent conduit,
   wherein the body of the injector adaptor is in the form of an asymmetric diverging cone with the injector adaptor outlet being greater in area than the injector adaptor inlet,
   wherein the DEF injector is coupled to the injector interface of the injector adaptor at a top side of the body of the injector adaptor, and
   wherein in a side view of the injector adaptor a bottom side of the body of the injector adaptor extends in a first plane, straight from the injector adaptor inlet to the injector adaptor outlet, and the top side of the body of the injector adaptor extends in a second plane at an acute angle relative to the first plane from the injector adaptor inlet to the injector adaptor outlet.

2. The engine system according to claim 1, wherein the injector adaptor inlet is directly connected to the turbo outlet.

3. The engine system according to claim 1, wherein the injector adaptor inlet is indirectly connected to the turbo outlet, an intervening conduit being provided therebetween.

4. The engine system according to claim 3, wherein the intervening conduit is bent.

5. The engine system according to claim 1, wherein the injector adaptor includes a mixer at the injector adaptor outlet.

6. The engine system according to claim 5, wherein the mixer of the injector adaptor is the only mixer from the turbo outlet to the aftertreatment inlet of the selective catalytic reduction (SCR) system.

7. The engine system according to claim 1, wherein the DEF injector is coupled to the injector interface of the injector adaptor to inject the DEF directly into the injector adaptor at an acute angle.

8. The engine system according to claim 7, wherein the acute angle is from 20 to 50 degrees.

9. The engine system according to claim 1, wherein a first shortest length of the injector adaptor from the injector adaptor inlet to the injector adaptor outlet is less than a second shortest length from the conduit inlet to the conduit outlet of the bent conduit.

10. An exhaust assembly comprising:
    an injector adaptor to be provided downstream of a turbocharger for an engine, the injector adaptor having a body that defines an injector adaptor inlet and an injector adaptor outlet opposite the injector adaptor inlet; and a diesel exhaust fluid (DEF) injector coupled to an injector interface of the injector adaptor to inject DEF into an internal volume of the injector adaptor, wherein the injector adaptor outlet has a first area greater than a second area of the injector adaptor inlet, wherein the injector adaptor includes a mixer at the injector adaptor outlet, wherein the DEF injector is coupled to the injector interface of the injector adaptor at a top side of the body of the injector adaptor, and wherein in a side view of the injector adaptor a bottom side of the body of the injector adaptor extends in a first plane, straight from the injector adaptor inlet to the injector adaptor outlet, and the top side of the body of the injector adaptor extends in a second plane at an acute angle relative to the first plane from the injector adaptor inlet to the injector adaptor outlet.

11. The exhaust assembly according to claim 10, wherein the DEF injector is coupled to the injector interface of the injector adaptor to inject the DEF at an acute angle directly into the internal volume of the injector adaptor, the acute angle being from 20 to 50 degrees.

12. The exhaust assembly according to claim 10, further comprising:

the turbocharger;

an aftertreatment system downstream of the turbocharger and the injector adaptor; and an exhaust conduit between the injector adaptor and the aftertreatment system.

13. The exhaust assembly according to claim 12, wherein the injector adaptor inlet is directly connected to an outlet of the turbocharger.

14. The exhaust assembly according to claim 12, wherein a first shortest length of the injector adaptor from the injector adaptor inlet to the injector adaptor outlet is less than a second shortest length from an inlet of the exhaust conduit to an outlet of the exhaust conduit.

15. An injector adaptor comprising:

a body defining an injector adaptor inlet at a first end of the injector adaptor and an injector adaptor outlet at a second end of the injector adaptor opposite the first end; and an injector mount extending from the body in a direction away from the injector adaptor outlet, the injector mount being between the first end and the second end of the injector adaptor, wherein the injector adaptor outlet defines a first area and the injector adaptor inlet defines a second area, the first area being greater than the second area, wherein in a side view of the injector adaptor, at a bottom side of the body of the injector adaptor, a first straight line extends along the body from the injector adaptor inlet to the injector adaptor outlet, wherein in the side view of the injector adaptor, at a top side of the body, of the injector adaptor opposite the bottom side, a second straight line extends along the body from the injector adaptor inlet to the injector adaptor outlet, and wherein the second straight line is at an acute angle relative to the first straight line.

16. The injector adaptor according to claim 15, further comprising a mixer at the injector adaptor outlet.

17. The injector adaptor according to claim 15, wherein the injector mount extends from the top side of the body of the injector adaptor.

18. The injector adaptor according to claim 15, wherein the injector mount is angled to interface with a diesel exhaust fluid (DEF) injector to inject DEF into an internal volume of the injector adaptor at an acute angle with respect to a longitudinal axis extending through the injector adaptor.

19. The injector adaptor according to claim 15, wherein the body of the injector adaptor is in the form of an asymmetric diverging cone from the injector adaptor inlet to the injector adaptor outlet.

20. The injector adaptor according to claim 15, wherein the injector adaptor inlet and the injector adaptor outlet are circular in an end view of the injector adaptor.

* * * * *